Feb. 17, 1931. L. IVERSEN 1,793,221
CLUTCH
Filed June 12, 1926 3 Sheets-Sheet 1

Fig.1.

Feb. 17, 1931.  L. IVERSEN  1,793,221
CLUTCH
Filed June 12, 1926   3 Sheets-Sheet 2

INVENTOR
Lorenz Iversen
by his attorneys
Byrnes, Stebbins & Parmelee

Feb. 17, 1931.  L. IVERSEN  1,793,221

CLUTCH

Filed June 12, 1926   3 Sheets-Sheet 3

INVENTOR
Lorenz Iversen
by his attorneys
Byrnes, Stebbins & Parmelee

Patented Feb. 17, 1931

1,793,221

UNITED STATES PATENT OFFICE

LORENZ IVERSEN, OF PITTSBURGH, PENNSYLVANIA, ASSIGNOR TO MESTA MACHINE COMPANY, OF PITTSBURGH, PENNSYLVANIA, A CORPORATION OF PENNSYLVANIA

CLUTCH

Application filed June 12, 1926. Serial No. 115,455.

The present invention relates broadly to the art of power transmission devices, and more particularly to devices of this nature ordinarily referred to as clutches. The present invention is particularly adaptable to use with mechanisms in which an intermittent operation is desirable, such as shears, presses, punches, and the like, although the utility of the invention is not limited with respect to the particular use to which the structure is placed.

It has heretofore been customary in the construction of clutches to utilize levers, pins and the like for effecting the desired operation of the parts during engagement or disengagement thereof. Such constructions, while satisfactory for performing the functions contemplated, have been somewhat objectionable in certain instances due to the inability to maintain lubrication of all of the parts, and due both to the expense of upkeep and the room required for the installation. Also, in clutches as ordinarily constructed, the operation incident to engagement and disengagement has usually been accompanied by a distinct clicking noise, and not infrequently the clearance between the parts is such that full disengagement is not always effected.

The present invention has for certain of its objects the provision of a clutch which is extremely quiet in operation and in which a predetermined clearance between the clutch members is insured whenever disengaged.

Another object of the invention is to provide a clutch construction which does not require any levers or pins, and in which the operating load is uniformly or symmetrically distributed to provide a balanced construction.

Still another object of the invention is to provide a clutch construction which is extremely compact and which is of such nature that the moving parts may run in oil.

In the accompanying drawings there is shown, for purposes of illustration only, a preferred embodiment of the present invention, it being understood that the drawings do not define the limits of my invention as changes in the construction and operation disclosed therein may be made without departing either from the spirit of the invention or the scope of my broader claims.

In the drawings—

Figure 1 is a top plan view, partly broken away and largely diagrammatic, of one form of clutch embodying the present invention;

Figure 2:
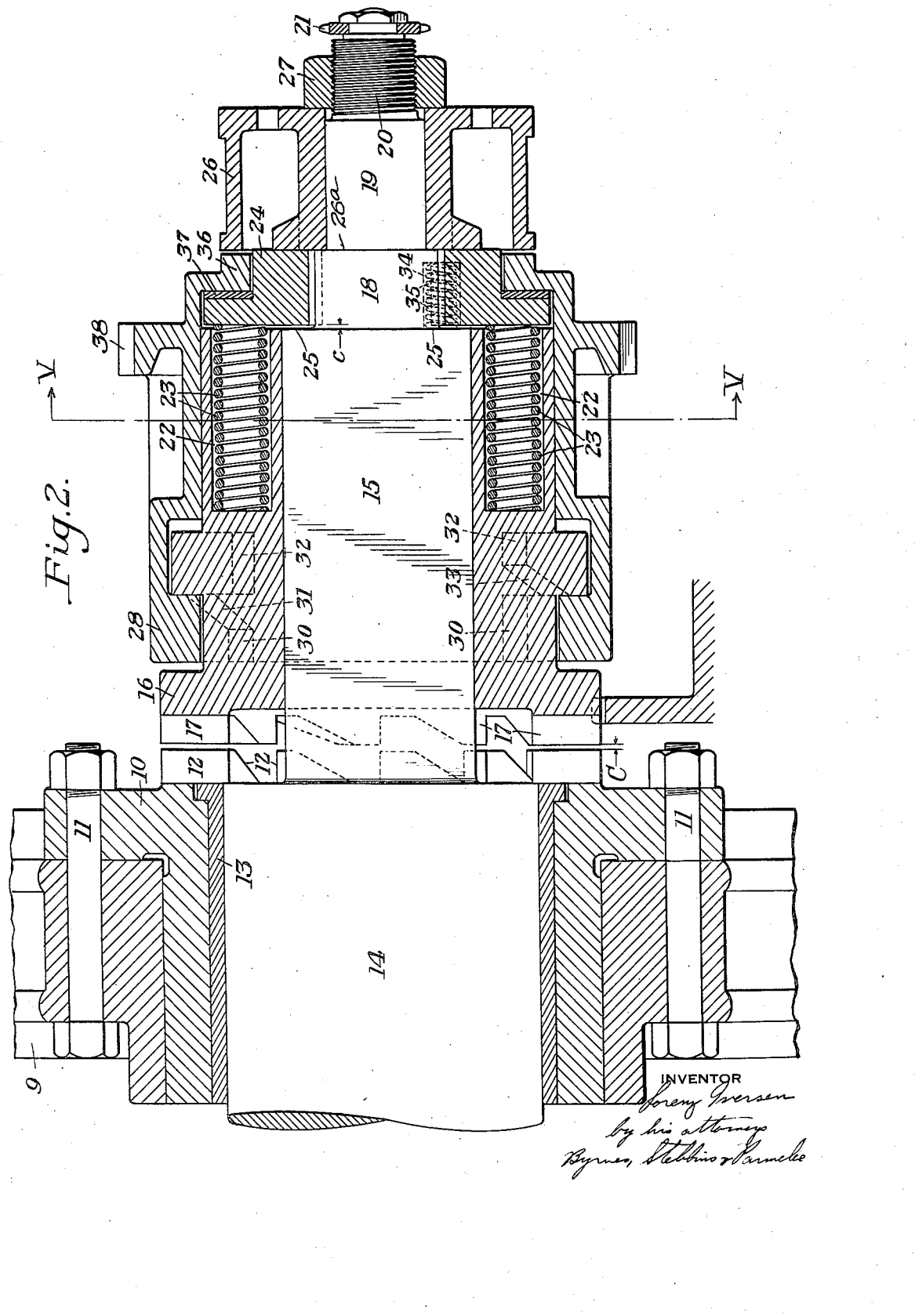
Figure 2 is a longitudinal sectional view, on an enlarged scale, with certain of the parts in elevation, along the line II—II of Figure 1.

In carrying out the present invention there may be provided a suitable supporting frame 2 having mounted thereon bearings 3 for a shaft 4 driven in any desired manner by a main operating motor, not shown. This shaft has secured thereto a pinion 5 meshing with a gear 6 on the shaft 7, which shaft carries a pinion 8 meshing with the main gear 9 provided for driving the shear, punch, press or other apparatus with which the clutch is used.

The gear 9 may conveniently be secured to a bushing 10 in any desired manner, as by bolts 11, the bushing being provided with teeth 12 and constituting one of the clutch members. This bushing may in turn cooperate with a suitable bearing sleeve 13 interposed between the same and the main shaft 14, whereby the gear 9 may rotate independently of the shaft 14 during such times as the clutch is disengaged.

Figure 5:
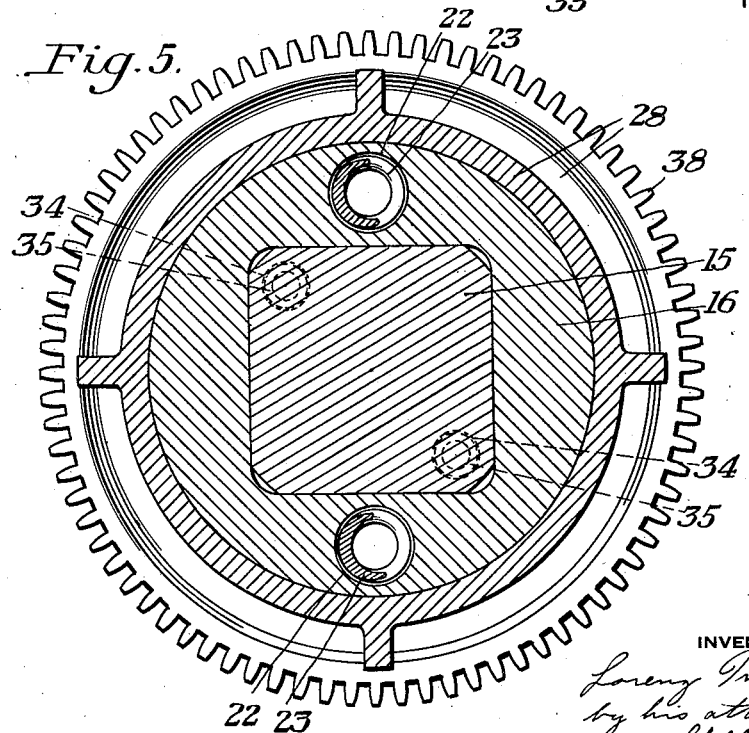
Figure 5 is a transverse sectional view on the line V—V of Figure 2 looking in the direction of the arrows.

The shaft 14 is formed with an extension 15 which may, if desired, be of substantially rectangular cross section, as clearly apparent from Figure 5 of the drawings. Slidable on this rectangular extension, or on a suitable spline carried by the extension in the event it is of circular cross section, is a second clutch member 16 having on its inner face teeth 17 adapted to cooperate with the teeth 12 on th member 10. The extension 15 is provided with a reduced portion 18, which in turn carries an extension 19 of smaller diameter having a threaded end 20 and shaped to receive a sprocket 21.

Figure 4:
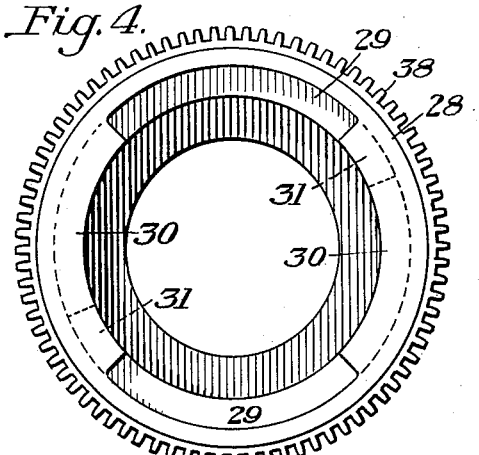
Figure 4 is an end elevation of the construction shown in Figure 3.

The clutch member 16 is conveniently formed in the shape of a sleeve adapted to slide longitudinally on the extension 15, and is provided with a series of pockets 22, preferably uniformly spaced as indicated, for example, in Figure 5, and adapted to receive compression springs 23. These springs normally bear at one end against the bottoms of the pockets, and at the other end against a thrust collar 24 keyed to the reduced portion 18 of the shaft and held against undue movement axially of the shaft by the shoulder 25 at one side thereof and by the brake drum 26 at the opposite side, the brake drum being forced against the shoulder 26$^a$ on the shaft by a clamping nut 27. Due to this construction, the springs 23 normally urge the clutch member 16 to the left, as viewed in Figure 2 of the drawings, in such manner that if the member 16 were free to move, driving engagement would be established between the teeth 12 and 17. Such movement of the clutch member 16 is controlled, however, by an actuating member 28 which may conveniently be constructed in the form of a sleeve, as apparent from Figures 3 and 4, having diametrically opposite cut-away portions 29 alternating with cam portions 30 carrying inclined planes 31. The clutch member 16 is similarly formed with diametrically opposite projections 32 carrying inclined planes 33 adapted for cooperation with the inclined planes 31 on the actuating sleeve. Due to the construction of the clutch member 16 and the sleeve 28, the parts may be assembled by relatively positioning them in such manner that the projections 32 may pass through the openings 29 and then effecting relative turning movement of the parts to bring the inclined planes 31 and 33 into engagement. It will be apparent that when these inclined planes, which may be in the form of screw threads or cams, as well understood in the art, the term "inclined planes" being used generically as a term of definition and not as a term of limitation, are brought into engagement by relative rotational movement between the actuating sleeve and the clutch member 16, the clutch member will be moved to the right to an amount determined by the inclined planes, and held in this position by the subsequent engagement of the flat surfaces on the projections 30 and 32 respectively, thereby preventing engagement of the clutch members.

Figure 3:
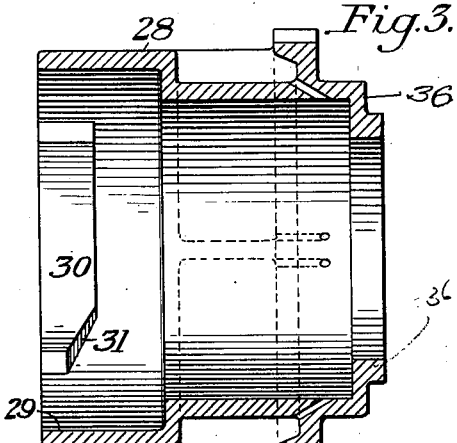
Figure 3 is a longitudinal sectional view through the clutch actuating sleeve.
Figure 6:
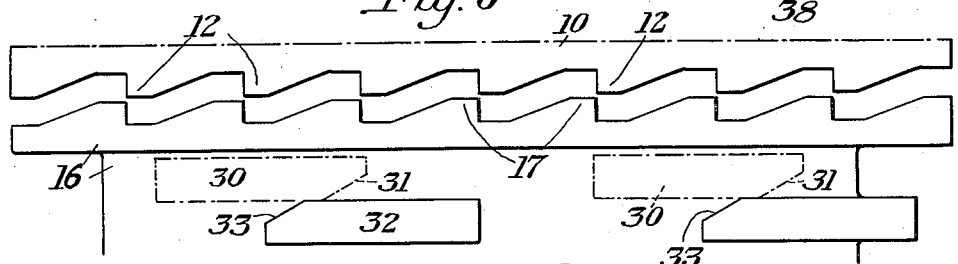
Figure 6 is a developed view illustrating the action of the clutch members.

As will be apparent from Figures 2 and 5 of the drawings, the thrust collar 24 is provided with pockets 34 in which are mounted compression springs 35 bearing at their outer ends against the bottoms of the pockets and at their inner ends against the shoulder 25. The actuating sleeve 28 is formed with an inwardly projecting flange 36 which overlies a portion of the thrust collar, the engagement between these parts preferably being established through the medium of a friction disk or liner 37. Due to this construction, when the inclined planes 31 and 33 come into engagement, there will be an initial movement of the actuating sleeve 28 to the left, as viewed in Figure 2, to an amount controlled by the clearance $c$ between the inner face of the thrust collar and the shoulder 25. This movement will be effective for compressing the springs 35. Thereafter, continued relative rotational movement between the actuating member and the clutch member 16 will effect disengagement, as pointed out, by reason of the axial movement which will be imparted to the clutch member 16 against the action of the springs 23. When the flat surfaces on the projections 30 and 32 come into engagement, however, the springs 35 will be effective for moving the thrust collar 24 to the right, as viewed in Figure 2, an amount determined by the clearance $c$, thereby effecting corresponding axial movement of the actuating sleeve 28 and the clutch member 16, which will result in a clearance C between the teeth 12 and 17 respectively. This movement will be substantially instantaneous upon the conclusion of the camming out operation referred to, and will prevent any riding over of the teeth or clicking thereof during engagement and disengagement.

The relative rotational movement between the actuating sleeve and the clutch member 16 may be obtained by providing the actuating sleeve with a gear 38 adapted to mesh with a gear 39 on a shaft 40 journaled in the frame 2 and carrying a worm wheel 41. This worm wheel may be driven in any desired manner as by a supplemental motor 42 and suitable gearing, not shown. The armature shaft of the motor 42 may be provided with a suitable brake 43 of any usual construction. Preferably, the main motor for the shaft 3 and the supplemental motor 42 will be of such construction, or will be so interconnected, as to insure rotation thereof in synchronism when both motors are operating, or under such relative speed conditions that the actuating sleeve will tend to rotate at a speed substantially equal to the speed of the clutch member 16. This movement is further assisted by the frictional engagement between the thrust collar and the flange 36, which engagement tends also to rotate the actuating sleeve at the speed of the shaft 14. It will, of course, be apparent that the relative speeds at which the motors operate will be determined by the respective gear ratios in their own gear trains.

Normally the parts occupy the position illustrated in Figure 2, at which time the main gear 9 with the clutch member 10 is rotating, and the shaft 14 stationary. When it is desired to effect engagement of the clutch, the supplemental motor is operated to effect relative rotational movement between the actuating sleeve and the clutch member 16, this relative movement being effective to slide the portions 30 out from holding relation to the projections or cams 32, the inclined planes 33 sliding down the inclined planes 31 as the springs 23 move the clutch member 16 axially of the shaft to bring the clutch teeth 12 and 17 into engagement. This will cause simultaneous rotation of all of the parts as set forth. To effect disengagement of the clutch, the supplemental motor is stopped, thereby holding the clutch sleeve 28 stationary and causing the inclined planes to engage and move the clutch member 16 axially in the opposite direction. As soon as the teeth 12 and 17 become disengaged and the clearance c is established by the springs 35, the main shaft 14 will stop rotation and remain inoperative until the clutch is again engaged.

In apparatus of the general character herein referred to it is not infrequently desirable to operate the parts through one cycle and then stop operation. This may be accomplished with a structure such as shown herein by controlling the supplemental motor by a limit switch 44 operated by the shaft 14 whereby the clutch will always disengage at a fixed position of the shaft and the machine will accordingly always become inoperative in a position ready to receive the next piece of material to be treated. The limit switch 44 may be operated in known manner from the main shaft through the sprocket 21 carried thereby and the sprocket chain 45 cooperating therewith. The brake drum 26 may cooperate with any usual form of brake 46 so set as to check rotation of the shaft 14 and its associated parts in predetermined timed relation to the operation of the supplemental motor and its corresponding action on the clutch.

Certain advantages of the present invention arise from the provision of a clutch which is extremely compact and in which a uniform distribution of operating force may be obtained by means of inclined planes and cooperating springs Another advantage of the present invention arises from the provision of a structure which may be operated in an oil bath, if desired, and in which levers, pins and the like are obviated.

Still further advantages arise from the provision of means insuring clearance between the points of the clutch teeth, such clearance preferably being obtained by a quick or jump action of the clutch, whereby clicking is eliminated.

I claim:

1. In a clutch mechanism, a pair of relatively rotatable coaxial elements, one a driving element and the other a driven element, a pair of cooperating jaw clutch members connected one to each element for rotation therewith, said members being separable and engageable by relative movements therebetween longitudinally of their axis of rotation, means for yieldably urging the clutch members into driving engagement, controlling means rotatably mounted coaxially with the clutch members, one of the clutch members and the controlling means having cooperating cam surfaces, and means for imparting a relative axial turning movement to the controlling means independently of movement of the driving element for causing the engagement of the cam surfaces whereby one clutch member is moved longitudinally of its axis out of engagement with the other, and for positively driving the controlling means with the clutch members during periods of driving engagement between said clutch members.

2. In combination, a pair or relatively rotatable coaxial elements, one a driving element and the other a driven element, a pair of cooperating jaw clutch members connected one to each element for rotation therewith, said members being separable and engageable by relative movements therebetween longitudinally of their axis of rotation, means for yieldably urging the clutch members into driving engagement, controlling means mounted coaxially and with the clutch members and rotatable relative thereto, one of the clutch members and the controlling means having cooperating cam surfaces, and means for positively rotating the controlling means relatively to the driving element for varying the cooperative relationship between the cam surfaces and urging means whereby one clutch member is moved longitudinally of its axis relative to the other, and for positively rotating the controlling means at the same speed as the clutch members during periods of driving engagement between said clutch members.

3. In combination, a pair of relatively rotatable coaxial elements, one a driving element and the other a driven element, a pair of cooperating jaw clutch members connected one to each element for rotation therewith, said members being separable and engageable by relative movements therebetween longitudinally of their axis of rotation, means for yieldably urging the clutch members into driving engagement, controlling means rotatably mounted coaxially with the clutch members, one of the clutch members and the controlling means having cooperating cam surfaces effective for imparting movements to said clutch member longitudinally of the axis of rotation, and means comprising a separate motor for positively turning the controlling means relatively to the driving element for varying the cooperative relationship between the cam surfaces and urging means.

4. In a clutch mechanism, a pair of relatively rotatable coaxial elements, one a driving element and the other a driven element, means for rotating the driving element, a pair of cooperating clutch members connected one to each element for rotation therewith, said members being relatively movable to engage and disengage the same, and means for producing relative movement between said clutch members comprising a cam member rotatably mounted coaxially with the clutch members, said cam member having a portion thereof frictionally driven by said driven element upon rotation of the latter, and means actuated independently of the rotating means for the driving element for rotating said cam member at the same speed as said clutch members or for decreasing the speed of rotation thereof at will.

5. In combination, a shaft, a pair of cooperating clutch members mounted thereon, means for urging one of the clutch members into engagement with the other clutch member, cylindrical controlling means coaxially mounted with one of the clutch members for controlling engagement and disengagement of the clutch members, and means for moving the controlling means and associated clutch member axially of the shaft when in clutch-restraining relationship for securing a predetermined clearance between the clutch members.

6. In combination, a shaft, a pair of cooperating clutch members mounted thereon, means for urging one of the clutch members into engagement with the other clutch member, cylindrical controlling means coaxially mounted with one of the clutch members for controlling engagement and disengagement of the clutch members, and means for moving the controlling means and associated clutch member as a unit axially of the shaft when in clutch-restraining relationship for securing a predetermined clearance between the clutch members.

7. A clutch mechanism comprising a shaft, a clutch member loosely mounted thereon and having teeth projecting longitudinally of the shaft, a second clutch member secured to the shaft against relative rotational movement and movable longitudinally thereof, said second clutch member having teeth for cooperation with the first-named teeth and a radially projecting cam surface, controlling means for the second clutch member mounted externally thereof for relative rotational movement, said controlling means having a cam surface overhanging the first-named cam surface and cooperating therewith, means for urging the clutch members into engagement, said urging means being rendered ineffective upon the disengagement of the clutch members by the controlling means, and means for urging the controlling means longitudinally of the shaft.

8. In a clutch mechanism, a pair of relatively rotatable coaxial elements, one a driving element and the other a driven element, means for rotating the driving element, a pair of cooperating jaw clutch members connected one to each element for rotation therewith, said members being separable and engageable by relative movements therebetween longitudinally of their axis of rotation, and means for producing relative movement between said members longitudinally of their axis comprising a cam member mounted coaxially with the clutch members and rotatable relative thereto, yieldable means opposed to the cam member, and means for rotating said cam member at the same speed as said clutch members or decreasing the speed of rotation thereof at will.

9. In a clutch mechanism, a pair of relatively rotatable coaxial elements, one a driving element and the other a driven element, means for rotating the driving element, a pair of cooperating jaw clutch members connected one to each element for rotation therewith, said members being separable and engageable by relative movements therebetween longitudinally of their axis of rotation, and means for producing relative movement between said members longitudinally of their axis comprising a cam member rotatably mounted coaxially with the clutch members, yieldable means opposed to the cam member, and means actuated independently of the rotating means for the driving element for rotating said cam member at the same speed as said clutch members or decreasing the speed of rotation thereof at will.

10. In a clutch mechanism, a pair of relatively rotatable coaxial elements, one a driving element and the other a driven element, means for rotating the driving element, a pair of cooperating jaw clutch members connected one to each element for rotation therewith, said members being relatively movable to engage and disengage the same, and means for producing relative movement between said clutch members comprising a cam member rotatably mounted coaxially with the clutch members, yieldable means opposed to the cam member, and means actuated independently of the rotating means for the driving element for rotating said cam member at the same speed as said clutch members or decreasing the speed of rotation thereof at will.

11. In combination, a pair of relatively rotatable coaxial elements, one a driving element and the other a driven element, a pair of cooperating jaw clutch members connected one to each element for rotation therewith, said members being separable and engageable by relative movements therebetween longitudinally of their axis of rotation, yieldable means for urging the clutch members into driving engagement, controlling means rotatably mounted coaxially with the clutch members, the clutch member connected to the driven element having a cam surface, the controlling means having a cam surface for cooperating with said first-mentioned cam surface, and means actuated independently of the rotating means for the driving element for rotating the controlling means, said cam surfaces cooperating to cause relative movement between said clutch members upon relative rotation between the controlling means and the clutch member connected to the driven element.

12. In combination, a pair of relatively rotatable coaxial elements, one a driving element and the other a driven element, a pair of cooperating jaw clutch members connected one to each element for rotation therewith, said members being separable and engageable by relative movements therebetween longitudinally of their axis of rotation, yieldable means for urging the clutch members into driving engagement, controlling means rotatably mounted coaxially with the clutch members, the clutch member connected to the driven element having a cam surface, the controlling means having a cam surface for cooperating with said first-mentioned cam surface, means actuated independently of the rotating means for the driving element for rotating the controlling means, and means for decelerating the controlling means to positively disengage the clutch members.

In testimony whereof I have hereunto set my hand.

LORENZ IVERSEN.